(12) United States Patent
Gold et al.

(10) Patent No.: US 8,056,691 B2
(45) Date of Patent: Nov. 15, 2011

(54) DEVICE FOR AXIALLY POSITIONING A CLUTCH DEVICE

(75) Inventors: Eckart Gold, Hockenheim (DE); Johannes Heinrich, Friedrichsdorf (DE); Marcus Hertel, Bruchsal (DE); Martin Gerlach, Hockenheim (DE); Götz Nicklas, Speyer (DE); Hans-Jürgen Hauck, Schwäbisch Hall (DE); Jens Henze, Ahnatal (DE)

(73) Assignee: BorgWarner Inc., Auburn Hills, MI (US)

( * ) Notice: Subject to any disclaimer, the term of this patent is extended or adjusted under 35 U.S.C. 154(b) by 957 days.

(21) Appl. No.: 11/628,391

(22) PCT Filed: Jun. 1, 2005

(86) PCT No.: PCT/EP2005/005856
§ 371 (c)(1),
(2), (4) Date: Dec. 20, 2007

(87) PCT Pub. No.: WO2005/119080
PCT Pub. Date: Dec. 15, 2005

(65) Prior Publication Data
US 2008/0196994 A1    Aug. 21, 2008

(30) Foreign Application Priority Data
Jun. 3, 2004  (EP) .................................. 04013095

(51) Int. Cl.
F16D 25/10  (2006.01)
F16D 25/12  (2006.01)
(52) U.S. Cl. ................. 192/48.611; 192/110 B; 192/115
(58) Field of Classification Search ............. 192/48.601, 192/48.609, 48.611, 48.618, 115
See application file for complete search history.

(56) References Cited

U.S. PATENT DOCUMENTS

| | | | | | |
|---|---|---|---|---|---|
| 1,801,590 | A | * | 4/1931 | Dickson | 192/105 B |
| 2,863,537 | A | * | 12/1958 | Root | 192/18 R |
| 3,077,252 | A | * | 2/1963 | Treer | 192/18 A |
| 3,472,350 | A | * | 10/1969 | Overson | 192/48.611 |
| 5,295,909 | A | * | 3/1994 | Heidenreich | 192/113.21 |
| 5,676,228 | A | * | 10/1997 | Lin | 192/64 |
| 6,402,257 | B1 | * | 6/2002 | Chen | 301/110.5 |

FOREIGN PATENT DOCUMENTS

| | | |
|---|---|---|
| EP | 1 052 421 A | 11/2000 |
| GB | 465 612 A | 5/1937 |
| GB | 812 784 A | 4/1959 |

* cited by examiner

*Primary Examiner* — Rodney Bonck
(74) *Attorney, Agent, or Firm* — Warn Partners, P.C.

(57) ABSTRACT

The invention relates to a device for axially positioning a clutch device, especially a dual-clutch device, on a rotary drive, wherein the clutch device is mounted so as to rotate about a rotational axis of said rotary drive. A retaining nut is coaxially screwed with the rotary drive, and the clutch device is indirectly or directly supported on said nut in an axial direction.

16 Claims, 3 Drawing Sheets derives from DE 19,921,687 A1, from which the invention starts out

DEVICE FOR AXIALLY POSITIONING A CLUTCH DEVICE

CROSS-REFERENCE TO RELATED APPLICATIONS

This application is a National Stage of International Application No. PCT/EP2005/005856 filed Jun. 1, 2005, which claims priority to European Patent Application No. 04013095.7 filed on Jun. 3, 2004. The disclosures of the above applications are incorporated herein by reference.

FIELD OF THE INVENTION

The invention relates to a device for axially positioning a clutch device, in particular a dual-clutch device, on a rotary drive.

BACKGROUND OF THE INVENTION

Clutch devices are known in the prior art in a multiplicity of variations. In order to rule out axial interference of the clutch device with adjacent parts, its position must be axially defined.

DE 19,921,687 A1, from which the invention starts out, discloses a dual clutch in radially nested design with a clutch hub bearing two outer disk carriers, which is seated on a stationary rotary drive capable of rotation about an axis of rotation. The clutch hub is supported toward the gear against the stationary rotary drive. In the direction of the motor side the clutch hub itself is not supported on the rotary drive. The dual clutch is axially positioned in that a hub of the inner disk carrier of the radially outer clutch is supported toward the motor by means of a spring ring on a gear input shaft. Embodiments without a stationary rotary drive and with axial positioning of the respective clutch arrangement by support on a gear input shaft are also disclosed in EP 1,226,992 A1.

Although such axial positioning basically has proved satisfactory, in the variant embodiments indicated above the problem arises that variations in length of the gear shafts due to tolerances, thermal expansion in operation, etc., because of the resulting great axial tolerances, have a negative effect on the operation of the clutch. In particular—as already disclosed in EP 1,226,992 A1—in some cases considerable stresses may be produced on the supporting and/or supported parts.

The object of the invention now consists in designing and developing a clutch device in such a way that axial tolerances of the gear input shafts can no longer negatively affect the operating behavior of the clutch device to such an extent.

This object is accomplished by a device for axially positioning a clutch device, in particular a dual-clutch device, on a rotary drive.

SUMMARY OF THE INVENTION

The invention is based on the idea of finding, in combination with a (preferably stationary) rotary drive, a positioning possibility with the clutch device independent of the gear input shafts. The accomplishment consists in a retaining nut screwed coaxially to the rotary drive, on which the components of the clutch device are indirectly or directly supported, preferably substantially non-displaceable, in an axial direction. This retaining nut provides for axial positioning of the clutch device surrounding this nut on both sides.

In order to insure low-friction relative movement of clutch components rotating against one another, according to the invention it is provided that the retaining nut have a contact surface on which a rolling bearing, in particular an axial needle bearing and/or a thrust washer, is axially supported. Corresponding to this, the clutch hub itself preferably has a contact surface on which the rolling bearing, in particular the axial needle bearing and/or the thrust washer, is axially supported on the other side. Other components of the clutch device executing a relative rotation to the clutch hub and the retaining nut, in particular disk carriers or components connected fixed against rotation with the latter or a clutch housing, may alternatively have a contact surface, on which the rolling bearing, in particular the axial needle bearing and/or the thrust washer, is axially supported on the other side.

It is provided that the retaining nut is already coupled with the rotary drive during mounting of the clutch. The clutch device, prefabricated in this way, can then be connected with the gear as a module.

Should coupling of the clutch device with the rotary drive during gear assembly be desired, i.e., that the clutch be connected with the rotary drive after the rotary drive has already been installed in the gear, it is provided in an especially advantageous variant embodiment of the invention that the retaining nut have an entrainment contour which is accessible from outside through appropriate recesses in surrounding coupling components and which permits assembly or disassembly of the clutch device.

The rotary drive may alternatively serve, in addition to the function of bearing the entire clutch device, as a feed and/or drainage device for fluid, preferably (hydraulic) fluid, required for operation of the clutch device. It is therefore provided, according to the invention, that the rotary drive have at least one fluid channel, via which a fluid, in particular cooling oil, pressure oil, relief oil, required for clutch cooling, for clutch actuation and/or otherwise required for operation of the clutch device, can be fed and/or drained.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The invention will now be described in detail, with reference to the drawings, wherein.

Like and functionally like components are provided with identical reference numerals in both figures.

DETAILED DESCRIPTION OF THE PREFERRED EMBOIMENTS

Figure 1:
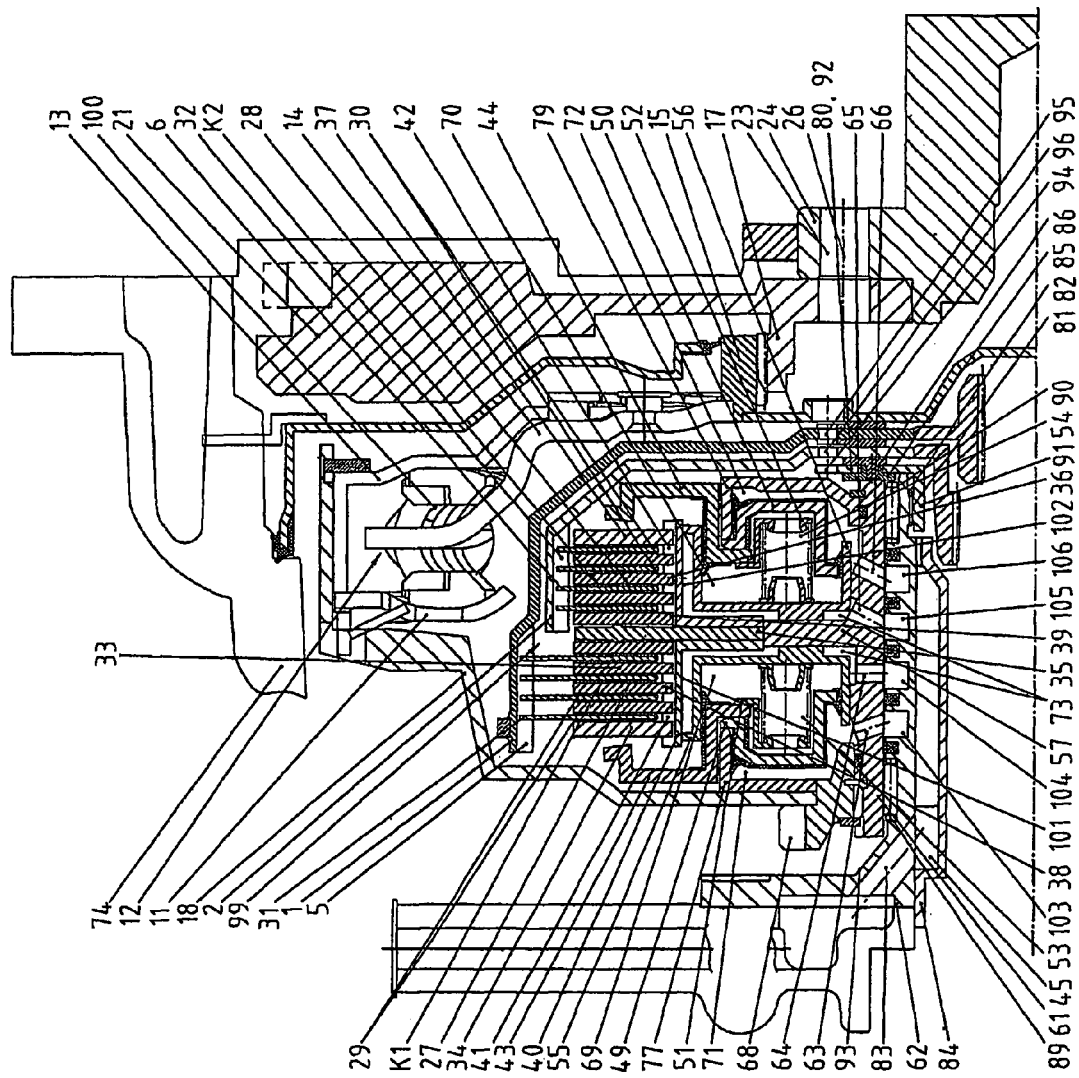
FIG. 1 shows a drive train having a dual clutch in axial half-section, in which is provided a first exemplary embodiment of an axial securing means according to the invention, FIG. 2, an additional drive train having a dual clutch in axial half-section, in which is provided a second exemplary embodiment of an axial securing means according to the invention, FIG. 3, a retaining nut according to the invention, as is used for axial support of a dual clutch of FIGS. 1 and 2.

FIG. 1 shows, by a section of a drive train for a motor vehicle, selected by way of example, a possible basic structure and the mode of operation of a device designed according to the invention for axially securing a dual clutch 99 to a rotary drive 62.

On the right-hand side of the figure in the drawing is indicated a crankshaft 24 capable of rotation about an axis of rotation ax and serving as the drive shaft, which is coupled for example with an internal combustion engine, a motor M or the like. This side represents the input side of the drive train. On the left-hand side of the drawing can be seen two gear input shafts, namely a central or solid shaft 10 and a hollow shaft 9, capable of rotation about the axis ax, which are coupled with a gear G or the like, not shown here. Thus, for example, the first gear input shaft (central or solid shaft 10) may be provided for the operation of all odd-numbered gears (e.g., 1, 3, 5, . . . ) and the second gear input shaft (hollow shaft 9) for the operation of all even-numbered gears (e.g., 2, 4, 6 . . . ) of the motor vehicle. The reverse gear could be assigned to the first gear input shaft (central or solid shaft 10) as well as to the second gear input shaft (solid shaft 9) of the gear G. This side represents the output side of the drive train.

The drive train further comprises a flywheel 21, a torsional vibration damper 12 as well as the previously mentioned dual clutch 99, by means of which the output shafts 9, 10 are capable of being connected for switching with the drive shaft 24.

The torsional vibration damper 12, the dual clutch 99 and the flywheel 21 are enclosed by an outer housing, the so-called clutch housing 74.

The rotational or torsional vibration damper 12 is designed in a manner known per se. On the input side it has a primary element 14 in the form of a half shell. On the output side is provided a secondary element consisting of a first half shell 13 and a second half shell 11. The primary element 14 and the secondary element 13, 11 are capable of rotation against one another about the axis of rotation ax and via a plurality of spring packages 100 are coupled arranged on an outer periphery of the rotational vibration damper 12.

The dual clutch 99 comprises two individual clutches K1, K2. Each clutch K1, K2 comprises an outer disk carrier 1, 2 and a common inner disk carrier 40. In the following, the outer disk carrier of the first clutch K1 is termed the first outer disk carrier 1, and the outer disk carrier of the second clutch K2 is termed the second outer disk carrier 2.

The two outer disk carriers 1, 2 are designed half shell-shaped, the first outer disk carrier 1 surrounding the second outer disk carrier 2 projecting overhanging in an axial direction. The inner disk carrier 40 comprises two half shells 101, 102, which are connected together on the back. In each instance, the cylindrical sections of the half shells 101, 102 extend over the regions of the half shell-shaped outer disk carriers 1, 2 running axially.

The two outer disk carriers 1, 2 have inner toothings 5, 6, which serve for guidance, axially displaceable but substantially fixed against rotation, of in the present case four disks 29, 30, each having corresponding outer toothings 31, 32. These are commonly alternatively termed outer disks 29, 30. In corresponding fashion, at the outer periphery of the inner disk carrier sections of the common inner disk carrier 40 assigned to the respective outer disk carriers 1, 2 are assigned outer toothings 41, 42, in which disks having inner toothings 38, 39, the so-called inner disks 36, are guided axially displaceable but fixed against rotation. The backs of the two half shells 101, 102 forming the inner disk carrier sections are supported against a common endplate 35. At the two outer ends of the common inner disk carrier 40, pressure plates 34, 37 are in each instance guided axially displaceable but substantially fixed against rotation, in the same way as the aforementioned inner disks 36.

The outer disks 29, 30, the inner disks 33, 36 as well as the two pressure plates 34, 37 and the common endplate 35 interlock in a manner known per se, in each instance forming a disk package 27, 28 assigned to a clutch K1, K2.

The two disk packages 27, 28 with the corresponding disks 29, 30, 33, 34, 35, 36, 37 thus are arranged, lying behind one another in an axial direction, on the common inner disk carrier 40. In the present exemplary embodiment, the friction areas of all disks 29, 30, 33, 34, 35, 36, 37 have substantially the same size, so that the individual clutches K1, K2 have equal operational efficiency. It is of course alternatively possible for the friction areas of the disks 29, 30, 33, 34, 35, 36, 37 to have outer and/or inner diameters of unlike size.

Piston/cylinder units, described below in detail, which serve for actuating the clutches K1, K2, additionally are components of the clutches K1, K2. In particular, to each clutch K1, K2 is assigned a hydraulically actuable actuating piston 43, 44. Each of these actuating pistons 43, 44 can be pressed against one of the pressure plates 34, 37, transmitting force and producing friction locking between the individual disks 29, 30, 33, 34, 35, 36, 37 and thus actuating the respective clutch K1, K2. Both clutches K1, K2 are actuated directed inward, the forces of reaction acting against the common endplate 35.

The actuating device for the two clutches K1, K2 in each instance comprises, in addition to the aforementioned actuating pistons 43, 44, by means of which the respective pressure plates 34, 37 of the disk package 27, 28 can be shifted in the direction of the common endplate 35, a cylinder 77, 79, a pressure piston 48, 50, a piston 51, 52, an equalizing piston 55, 56 and a plurality of spiral springs 53, 54 arranged in the peripheral direction. The respective actuating pistons 43, 44 are supported outward against the respective pressure pistons 49, 50, which are guided axially displaceable on the cylinders 77 and 79 and on the outer periphery of a clutch hub 61. Directed inward, the actuating pistons 43, 44 are supported against the pistons 51, 52. These in turn are supported inward directed against the spiral springs 53, 54. The springs 53, 54 are supported directed inward against the outer surfaces of the compensation pistons 55, 56. These compensation pistons 55, 56 are supported against a peripheral crosspiece 57 of the clutch hub 61 bearing the common inner disk carrier 40.

Although the entire clutch device consisting of the two individual clutches K1 and K2 could be seated directly on the second gear input shaft (hollow shaft 9), in the present embodiment a separate rotary drive 62 is provided, which surrounds the two gear input shafts, the hollow shaft 9 and the solid shaft 10, coaxially and on which the clutch hub 61 is seated capable of rotation by means of two radial needle bearings 89, 90.

The rotary drive 62 may be designed in one piece or in multiple pieces, axially as well as radially. In the present case, the rotary drive 62 is designed in two pieces. It consists of a jacket 83 and a bushing 84 enclosed by the latter. The outer periphery of the cylindrical jacket-like bushing 84 has four longitudinal grooves 45 of unlike length, running in an axial direction. The jacket 83 has four grooves 103, 104, 105, 106, running in the peripheral direction, corresponding to the arrangement of the aforementioned longitudinal grooves 45. These peripheral grooves 103, 104, 105, 106 are connected via openings (not shown here) running radially with the corresponding longitudinal grooves 45.

Corresponding to the peripheral grooves 103, 104, 105, 106, the clutch hub 61 has four openings running substantially radially and partly axially inclined, which below are termed hydraulic fluid channels 63, 64, 65 and 66.

Supply of the volumes formed by the pistons 43, 44, 49, 50, 55, 56 (first pressure chamber 71, second pressure chamber 72, first equalizing chamber 69, second equalizing chamber 70, cooling liquid chamber 73) with hydraulic fluid is effected via the grooves 45 in the bushing 84, the openings and grooves 103, 104, 105, 106 in the jacket 83 and the hydraulic fluid channels 63, 64, 65, 66 in the clutch hub 61.

The first pressure chamber 71 can be pressurized with hydraulic fluid via the first hydraulic fluid channel 63. This hydraulic fluid pressure presses the pressure piston 49 and thus the actuating piston 45 and the piston 51 inward against the pressure of the spiral springs 53. Such displacement of the actuating piston 45 results in its outer periphery being pressed against the pressure plate 34 of the first clutch K1, actuating the latter.

In the same way, the second pressure chamber 72 can be pressurized with hydraulic fluid via the fourth hydraulic fluid channel 66. Because of this hydraulic fluid pressure, the pressure piston 50 and thus the actuating piston 44 and the piston 52 are pressed inward against the pressure of the springs 54. This in corresponding fashion results in the outer periphery of the actuating piston 44 being pressed against the pressure plate 37 of the second clutch K2, actuating the latter.

The equalizing chambers 69, 70 as well as the cooling liquid chamber 73 are filled with hydraulic fluid via the two hydraulic fluid channels 64 and 65. The hydraulic fluid in the equalizing chambers 69, 70 acts to produce a centrifugal force-induced hydraulic fluid counterpressure, which counteracts the centrifugal force-induced pressure increase in the respective pressure chamber 71, 72. The hydraulic fluid in the cooling liquid chamber 73 is conveyed for cooling the disks 29, 30, 33, 34, 35, 36, 37 through openings running radially in the inner disk carrier 40 to the disks 29, 30, 33, 34, 35, 36, 37.

The components of the drive train, described in detail above, are connected together as follows. The crankshaft 24 is screwed (bolt 26, bore 23) to the inner periphery of the flywheel 21. In the vicinity of the inner periphery of the flywheel 21 is mounted an inner flange 17 with outer toothing. The primary element 14 bears on its inner periphery a primary flange 15 with inner toothing. The outer toothing of the inner flange 17 of the flywheel 21 engages in the manner of plug-in toothing 16 in the inner toothing of the primary flange 15 of the primary element 14 of the torsional vibration damper 12, producing a connection fixed against rotation.

The first half shell 13 of the secondary element 11, 13 of the torsional vibration damper 12 at the same time forms a first half shell of a clutch housing. A second half shell 18 of the clutch housing is on the outer peripheral side connected fixed against rotation with the first half shell 13 of the secondary element and clutch housing. On the inner peripheral side there is a connection, fixed against rotation, to the clutch hub 61 and via its peripheral crosspiece 57 to the inner disk carrier 40 of the dual clutch 99.

The outer disk carriers 1, 2 have flanges 3, 4, which by means of plug-in toothings 7, 8 are connected fixed against rotation with the two gear input shafts 9, 10.

A torque introduced via the crankshaft 24 is transmitted via the flywheel 21 to the primary element 14 of the torsional vibration damper. The spring-elastic coupling between the primary element 14 and the secondary element 11, 13 damps undesirable rotational vibrations. The torque, largely free of undesirable rotational vibrations, is transmitted by the secondary element 11, 13 on to the second half shell 18 of the clutch housing and from there on to the clutch hub 61 and the common inner disk carrier 40. By means of the dual clutch 99 the torque may be selectively transmitted via one of the two outer disk carriers 1, 2 to one of the two gear input shafts 9, 10.

For the sake of completeness, let it be mentioned that a rotational movement introduced via the crankshaft 24 also drives, via a pump drive gear wheel 68 assigned to the clutch hub 61, a hydraulic pump, not shown here, for development of the aforementioned hydraulic fluid pressure.

It is desirable to fix the dual clutch 99 with the two individual clutches K1, K2, the clutch housing 18, 13, the outer disk carriers 1, 2, the inner disk carrier 40, the piston/cylinder units 43, 44, 49, 50, 51, 52, 53, 54, 55, 56 and the clutch hub 61 as positionally accurately as possible and independent of axial movements of the gear shafts in the transmission. For this purpose, the invention provides a retaining nut 80 capable of being screwed to the rotary drive 62, on which the components of the dual clutch 99 can be supported axially on both sides.

In this connection, a number of scenarios are possible, such as for example:
first the rotary drive 62 is mounted in the gear G and then the clutch 99 is screwed by means of the retaining nut 80 to the rotary drive 62;
first the rotary drive 62 is screwed by means of the retaining nut 80 to the clutch 99 and the module then fixed in the gear G by means of the rotary drive 62;
the rotary drive 62, already during mounting of the clutch, is fixed in the module by means of the retaining nut 80, in order then in turn to be fixed (by means of rotary drive 62) in the gear as a complete module.

In the present exemplary embodiment, the clutch hub 61 on the motor side is indirectly supported on the retaining nut 80 via a thrust washer 85.

Owing to the closed construction of the dual clutch 99, which surrounds the retaining nut 80 clamp-like, the clutch on the gear side is supported on the retaining nut 80 via the outer disk carrier 2 indirectly via a thrust washer 86. Hence (disregarding a certain amount of play in the clutch), displacement of the dual clutch 99 in both directions is prevented.

In the present exemplary embodiment, the retaining nut 80 has a disk 92, which extends radially from the jacket 83 of the rotary drive 62 all the way to over the inner diameter of the clutch hub 61. The disk 92 goes on the inner peripheral side into a tubular or cylindrical sleeve 91, which on the outer periphery has a thread 81. This thread 81 engages in a thread 82 provided on the inner periphery of the jacket 83 of the rotary drive 62. In this way, the retaining nut 80 is connected axially non-displaceable with the rotary drive 62. The disk 92 prevents axial displacement of the clutch with respect to the rotary drive 62.

According to the invention, screwing may of course alternatively be performed in reverse, i.e., the retaining nut provided with internal thread and the element/structural part serving for fastening provided with external thread.

Figure 2:
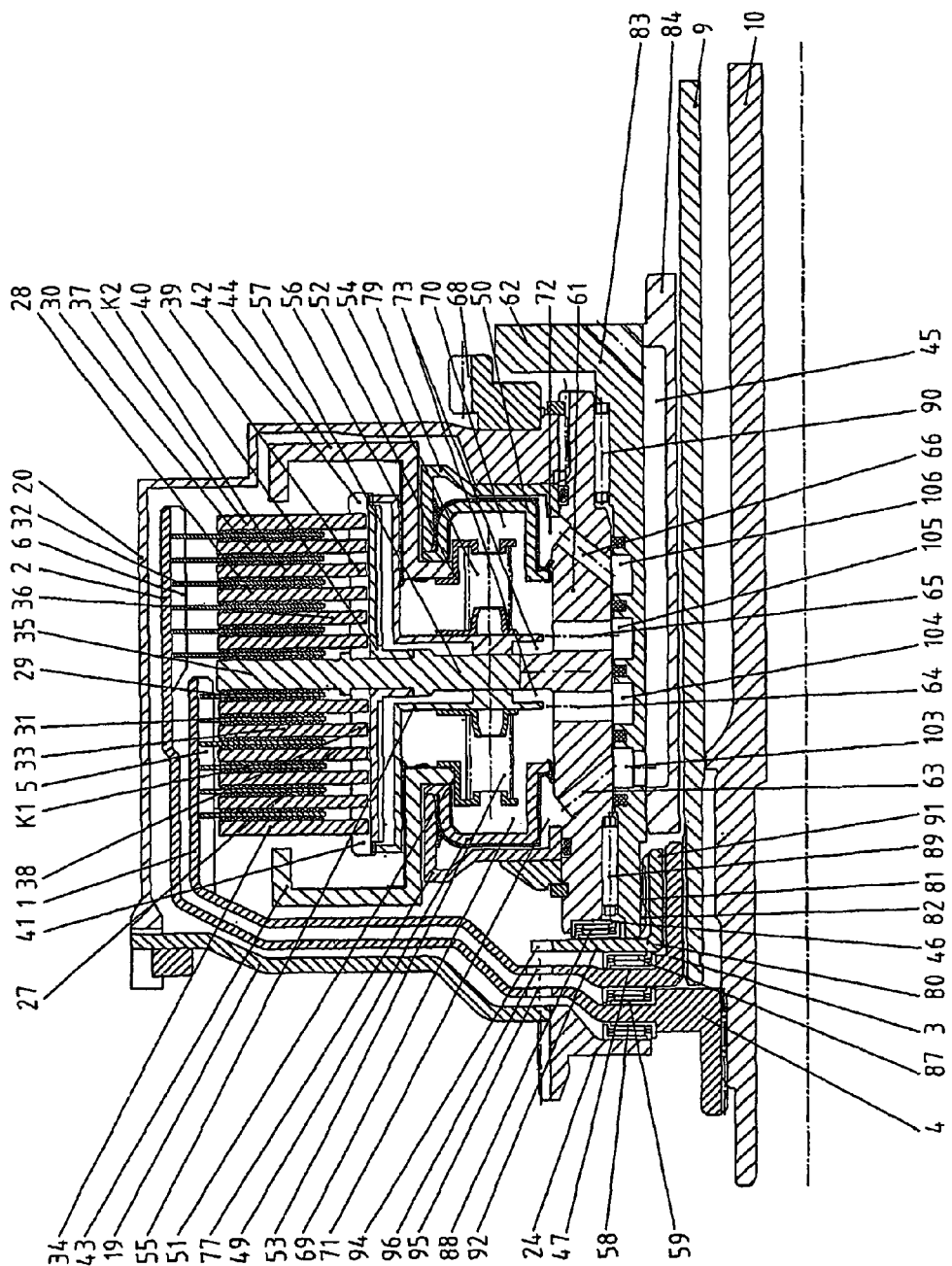

FIG. 2 shows an additional drive train with a dual clutch 99 in axial half-section, in which is provided a second exemplary embodiment of an axial securing device 80 according to the invention.

On the left-hand side of the figure in the drawing is indicated a crankshaft 24, capable of rotation about an axis of rotation ax and serving as the drive shaft, which is coupled with a motor M or the like. This side represents the input side of the drive train. On the right-hand side of the drawing can be seen two gear input shafts, namely a central or solid shaft 10 and a hollow shaft 9, capable of rotation about the axis ax, which are coupled with a gear G or the like, not shown here. This side represents the output side of the drive gear. The drive train in addition comprises the dual clutch 99, mentioned above, by means of which the output shafts 9, 10 are capable of being connected for switching with the drive shaft 24.

The dual clutch 99 comprises two individual clutches K1, K2, which are arranged axially adjacent to one another. In each instance, each clutch K1, K2 comprises an outer disk carrier 1, 2 and a common inner disk carrier 40. The two outer disk carriers are designed half shell-shaped, the first outer disk carrier 1 surrounding the second outer disk carrier 2 projecting overhanging in an axial direction. The inner disk carrier 40 has a substantially cylindrical shape and extends over the regions of the half shell-shaped outer disk carriers 1, 2 running axially.

The two outer disk carriers 1, 2 have inner toothings 5, 6. These serve for guidance, axially displaceable but substantially fixed against rotation, of in the present case six disks 29, 30 with corresponding outer toothings 31, 32 in each instance. In corresponding fashion, on the outer periphery of the inner disk carrier sections of the common inner disk carrier 40 assigned to the respective outer disk carriers 1, 2, are mounted outer toothings 41, 42, in which disks 33, 36, each having six inner toothings 38, 39, are in each instance guided axially displaceable but fixed against rotation. The disks situated at the open outer ends of the common inner disk carrier 40 are alternatively termed pressure plates 34, 37. The outer disks 29, 30, the inner disks 33, 36, and the two pressure plates 34, 37 interlock in a manner known per se, in each instance forming a disk package 27, 28 assigned to a clutch K1, K2. The two disk packages 27, 28 are supported against a common endplate 35, which in the present exemplary embodiment is formed integral with the inner disk carrier 40.

To each clutch K1, K2 is assigned a hydraulically actuable actuating piston 43, 44. Each of these actuating pistons 43, 44 can be pressed against one of the pressure plates 34, 37, transmitting force and producing friction locking between the individual disks 29, 30, 33, 34, 35, 36, 37 and thus pressing and actuating the respective clutch K1, K2. Both clutches K1, K2 are actuated directed inward, the forces of reaction acting against the common endplate 35.

In addition to the aforementioned actuating pistons 43, 44, by means of which the respective pressure plates 34, 37 of the disk packages 27, 28 can be displaced in the direction of the common endplates 35, to each clutch K1, K2 is in each instance assigned a cylinder 77, 79, a pressure piston 49, 50, a piston 51, 52, an equalizing piston 55, 56 as well as a plurality of spiral springs 53, 54 arranged in the peripheral direction. The respective actuating pistons 43, 44 are supported axially outward against the respective pressure pistons 49, 50, which are guided axially displaceable on the cylinders 77, 79 and on the outer periphery of a clutch hub 61. Directed axially inward, the actuating pistons 43, 44 are supported against the pistons 51, 52. The latter in turn are supported directed inward against the spiral springs 53, 54. The springs 53, 54 are directed axially inward against the outer surfaces of the compensation pistons 55, 56. These compensation pistons 55, 56 are supported against a peripheral crosspiece 57 of the clutch hub 61 bearing the common inner disk carrier 40. The inner disk carrier 40, the peripheral crosspiece 57 and the clutch hub 61 in the present exemplary embodiment form a one-piece structural unit.

The clutch hub 61 is seated, by means of two radial needle bearings 89, 90, capable of rotation about the axis ax on a stationary rotary drive 62. This rotary drive 62 surrounds the two gear input shafts, the hollow shaft 9 and the solid shaft 10, coaxially.

The rotary drive 62 may be designed in one piece or in multiple pieces, axially as well as radially. In the present case, the rotary drive 72 is designed in two pieces. It consists of a jacket 83 and a bushing 94 enclosed by the latter. The outer periphery of the cylinder jacket-like bushing 84 has four longitudinal grooves 45 of unlike length, running in the axial direction. The jacket 83, has four grooves 103, 104, 105, 106 running in the peripheral direction, corresponding to the arrangement of the aforementioned longitudinal grooves 45. These peripheral grooves 103, 104, 105, 106 are connected via openings running radially (not shown here) with one of the corresponding longitudinal grooves 45 in each instance.

Corresponding to the peripheral grooves 103, 104, 105, 106, the clutch hub 61 has four openings running substantially radially and partly axially inclined, which below are termed hydraulic fluid channels 63, 64, 65 and 66. Supply of the volumes formed by the pistons 43, 44, 49, 50, 55, 56, namely the first pressure chamber 71, the second pressure chamber 72, the first equalizing chamber 69, the second equalizing chamber 70 and the cooling liquid chamber 73, with hydraulic fluid is effected via the grooves 45 in the bushing 84, the openings and grooves 103, 104, 105, 106 in the jacket 83 and the hydraulic fluid channels 63, 64, 65, 66 in the clutch hub 61.

The first pressure chamber 71 can be pressurized with hydraulic fluid via the first hydraulic fluid channel 63. This hydraulic fluid pressure presses the pressure piston 49 and thus the actuating piston 45 and the piston 51 inward against the pressure of the springs 53. The result of such displacement of the actuating piston 45 is that its outer periphery is pressed against the pressure plate 34 of the first clutch K1, actuating the latter.

In the same way, the second pressure chamber 72 can be pressurized with hydraulic fluid via the fourth hydraulic fluid channel 66. Because of this hydraulic fluid pressure, the pressure piston 50 and thus the actuating piston 44 and the piston 52 are pressed inward against the pressure of the springs 54. This in corresponding fashion results in the outer periphery of the actuating piston 44 being pressed against the pressure plate 37 of the second clutch K2, actuating the latter.

The equalizing chambers 69, 70 as well as the cooling liquid chamber 73 are filled with hydraulic fluid via the two hydraulic fluid channels 64 and 65. The hydraulic fluid in the equalizing chambers 69, 70 acts to produce a centrifugal force-induced hydraulic fluid counterpressure, which counteracts the centrifugal force-induced pressure increase in the respective pressure chamber 71, 72. The hydraulic fluid in the cooling liquid chamber 73 is conveyed for cooling of the disks 29, 30, 33, 34, 35, 36, 37 through openings running radially in the inner disk carrier 40 to the disk packages 27, 28.

The components of the drive train described in detail above are connected together as follows. The crankshaft 24 is connected with a first side disk 19 of the clutch housing 19, 20, consisting of two half shells. The second half shell 20 of the clutch housing is connected on the outer peripheral side, fixed against rotation, with the first half shell 19 of the clutch housing. On the inner peripheral side, there is a connection, fixed against rotation, to the clutch hub 61 and, via its peripheral crosspiece 57, to the common inner disk carrier 40 of the dual clutch 99. The outer disk carriers 1, 2 have flanges 3, 4, which by means of plug-in toothings 7, 8 are connected fixed against rotation with the two gear input shafts 9, 10.

A torque introduced by the crankshaft 24 is transmitted via the two half shells 19, of the clutch housing and from there on to the clutch hub 61 and the common inner disk carrier 40. By means of the dual clutch 99 the torque may be selectively transmitted via one of the two outer disk carriers 1, 2 to one of the two gear input shafts 9, 10.

For the sake of completeness, let it be mentioned that a rotational movement introduced via the crankshaft 24 also drives, via a pump drive gear wheel 68 arranged on the clutch hub 61, a hydraulic pump, not shown here, for development of the aforementioned hydraulic fluid pressure.

In the exemplary embodiment of FIG. 2 presented here, the clutch hub 61 is indirectly supported on the motor side, via an axial needle bearing 88, on the retaining nut 80. On the gear side, the clutch is indirectly supported via the outer disk carrier 2, via an axial needle bearing 87, on the retaining nut 80.

The retaining nut 80 has a disk 92, which extends radially from the jacket 83 of the rotary drive 62 to over the inner diameter of the clutch hub 61. The disk 92 goes on the inner peripheral side into a cylindrical sleeve 91, which at the outer periphery has a thread 81. This thread 81 engages in an internal thread 82 provided on the inner periphery of the jacket 83 of the rotary drive 62. In this way, the retaining nut 80 is connected axially non-displaceable with the rotary drive 62.

The two side surfaces 85, 86 of the disk 92 of the retaining nut 80, pointing in the direction of the axis ax, serve as contact surfaces for axial needle bearings 87, 88. Against one of these axial needle bearings 87 is supported a contact surface 46 of the clutch hub 61, running radially, and against the other, a contact surface of the outer disk carrier 1 of the first clutch K1. The two outer disk carriers 1, 2 of the two clutches K1, K2 as well as the first side disk 19 of the clutch housing 19, 20 are supported capable of rotation on one another by means of additional axial needle bearings 58, 59.

Figure 3:
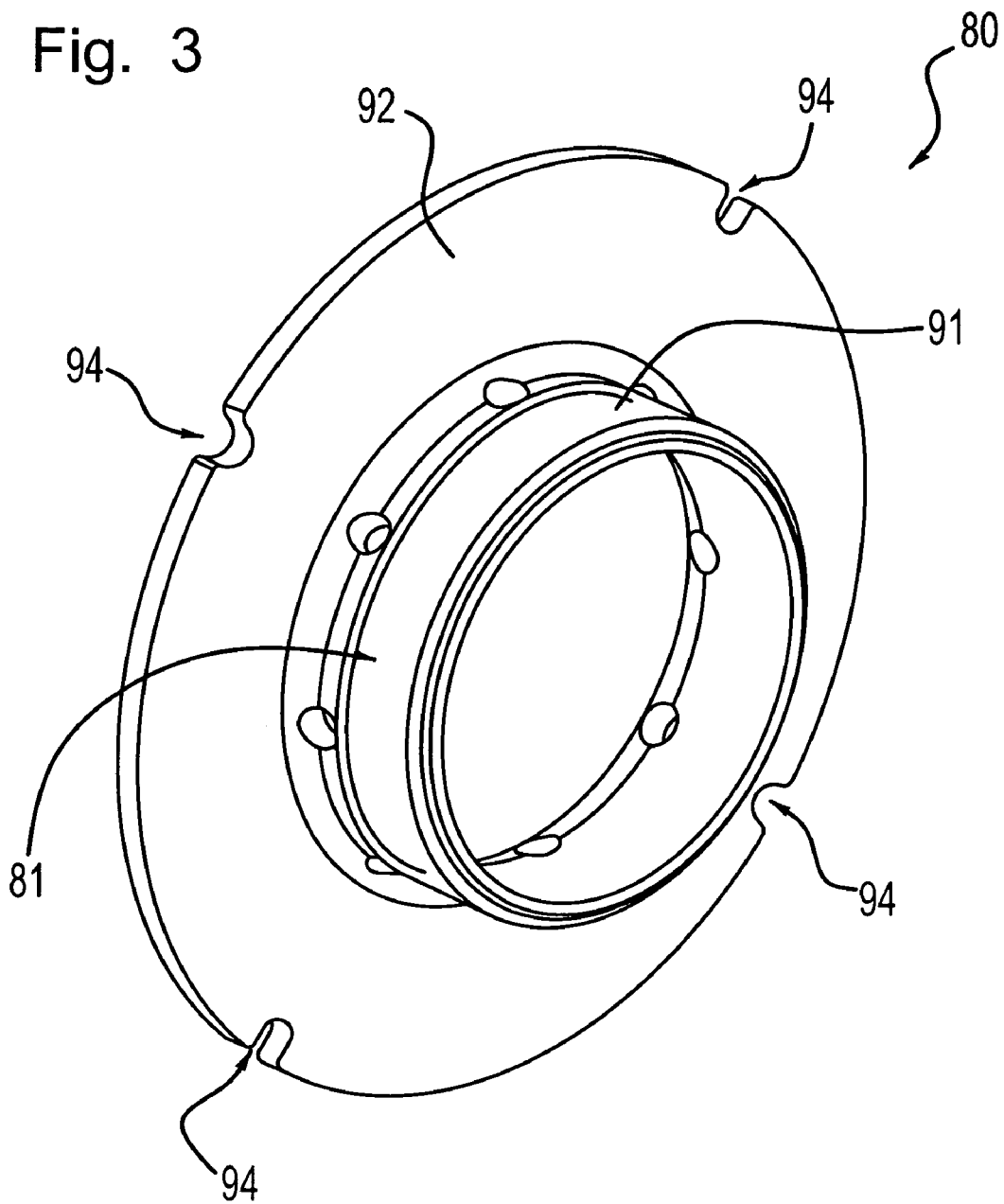

The retaining nut 80, which is shown in perspective representation in FIG. 3, has an entrainment contour 94, which is accessible from outside through corresponding recesses 95, 96 in the two outer disk carriers 1, 2 of the two clutches K1, K2. In the concrete case, four recesses 94, placed at the outer periphery of the disk 92, are provided as an entrainment contour 94 into which a tool can be inserted through the recesses 95, 96 in the outer disk carriers 1, 2 in order to assemble or disassemble the clutch device by turning the retaining nut 80.

The description of the invention is merely exemplary in nature and, thus, variations that do not depart from the gist of the invention are intended to be within the scope of the invention. Such variations are not to be regarded as a departure from the spirit and scope of the invention.

The invention claimed is:

1. Device for axially positioning a clutch device comprising:
   a rotary drive having a jacket, about which the clutch device is seated capable of rotation about an axis of rotation, said jacket including an inner periphery having a threaded portion; and
   a retaining nut having a disk formed as part of and extending radially from a cylindrical sleeve, the cylindrical sleeve having a corresponding threaded portion screwed coaxially to the threaded portion on the inner periphery of the jacket, said clutch device thereby being indirectly or directly supported in an axial direction on said rotary drive;
   wherein the retaining nut has a contact surface, on which a rolling bearing is axially supported.

2. Device according to claim 1, wherein the clutch device is supported substantially non-displaceably on the retaining nut.

3. Device according to claim 1, wherein the clutch device is supported with a predetermined clutch play on the retaining nut.

4. The device according to claim 1, wherein said rolling bearing comprises an axial needle bearing, a thrust washer or a combination thereof.

5. Device according to claim 1, wherein the retaining nut has an entrainment contour, which in particular is accessible through corresponding recesses in surrounding clutch components and which permits assembly or disassembly of the clutch device.

6. Device according to claim 1, wherein the rotary drive has at least one fluid channel, via which a fluid, in particular cooling oil, pressure oil, relief oil, required for clutch cooling, for clutch actuation and/or otherwise required for operation of the clutch device can be fed or drained.

7. Device of claim 1, wherein said clutch device further comprises a dual clutch device.

8. Device for axially positioning a clutch device comprising:
   a rotary drive having a jacket, about which the clutch device is seated capable of rotation about an axis of rotation, said jacket including an inner periphery having a threaded portion; and
   a retaining nut having a disk formed as part of and extending radially from a cylindrical sleeve, the cylindrical sleeve having a corresponding threaded portion screwed coaxially to the threaded portion on the inner periphery of the jacket, said clutch device thereby being indirectly or directly supported in an axial direction on said rotary drive;
   wherein the rotary drive has at least one fluid channel, via which a fluid, in particular cooling oil, pressure oil, relief oil, required for clutch cooling, for clutch actuation and/or otherwise required for operation of the clutch device can be fed or drained.

9. Device according to claim 8, wherein the clutch device is supported substantially non-displaceably on the retaining nut.

10. Device according to claim 8, wherein the clutch device is supported with a predetermined clutch play on the retaining nut.

11. Device according to claim 8, wherein the retaining nut has an entrainment contour, which in particular is accessible through corresponding recesses in surrounding clutch components and which permits assembly or disassembly of the clutch device.

12. Device of claim 8, wherein said clutch device further comprises a dual clutch device.

13. Device for axially positioning a clutch device comprising:
   a rotary drive having a jacket, about which the clutch device is seated capable of rotation about an axis of rotation, said jacket including an inner periphery having a threaded portion; and
   a retaining nut having a disk formed as part of and extending radially from a cylindrical sleeve, the cylindrical sleeve having a corresponding threaded portion screwed coaxially to the threaded portion on the inner periphery of the jacket, said clutch device thereby being indirectly or directly supported in an axial direction on said rotary drive;
   wherein said clutch device further comprises a dual clutch device.

14. Device according to claim 13, wherein the clutch device is supported substantially non-displaceably on the retaining nut.

15. Device according to claim 13, wherein the clutch device is supported with a predetermined clutch play on the retaining nut.

16. Device according to claim 13, wherein the retaining nut has an entrainment contour, which in particular is accessible through corresponding recesses in surrounding clutch components and which permits assembly or disassembly of the clutch device.

* * * * *

UNITED STATES PATENT AND TRADEMARK OFFICE
CERTIFICATE OF CORRECTION

PATENT NO.           : 8,056,691 B2                                            Page 1 of 1
APPLICATION NO.      : 11/628391
DATED                : November 15, 2011
INVENTOR(S)          : Eckhart Gold et al.

It is certified that error appears in the above-identified patent and that said Letters Patent is hereby corrected as shown below:

Title Page
Item [75], Inventors, "Götz Nicklas, Speyer (DE);" should be
-- Götz Nicklas, Römerberg (DE); --.

Column 2,
Line 60, "EMBOIMENTS" should be -- EMBODIMENTS --.

Column 7,
Line 63, "rotary drive 72" should be -- rotary drive 62 --.

Column 8,
Line 58, "two half shells 19" should be -- two half shells 19,20 --.

Signed and Sealed this
Thirty-first Day of July, 2012

David J. Kappos
*Director of the United States Patent and Trademark Office*